| [72] | Inventor | Ivan Cin(
Southfiel |
| [21] | Appl. No. | 819,028 |
| [22] | Filed | Apr. 24, 1969 |
| [45] | Patented | July 6, 1971 |
| [73] | Assignee | Chain Lakes Research Corporation
Detroit, Mich. |

[54] HOLOGRAPHIC PRESSURE SENSOR
10 Claims, 1 Drawing Fig.

[52] U.S. Cl................................................. 73/406,
73/71.3
[51] Int. Cl............................................... G01l 7/08
[50] Field of Search................................... 73/398,
406, 407, 408, 71.3; 350/295

[56] References Cited
OTHER REFERENCES
Gottenberg, " Some Applications of Holographic Inter- MECHANICS, Vol. 8, Sept.,
class 73/71.3

*Primary Examiner*—Donald O. Woodiel
*Attorney*—Hauke, Krass, Gifford and Patalidis ABSTRACT: A pressure sensor consisting essentially of a deformable diaphragm having a side subjected to the action of a fluid, liquid or gas, whose pressure is sought to be measured. The other side of the diaphragm is illuminated by an image of the diaphragm at rest which is reconstructed from a hologram. The interference of the light from the reconstructed hologram image of the diaphragm and the light reflected from the actual diaphragm creates interference fringes whose number and arrangement provide an indication of the pressure of the fluid. A detector, such as a photocell, is coupled to a meter for providing a visual quantitative information of the pressure of the fluid.

PATENTED JUL-6 1971

3,590,640

INVENTOR
IVAN CINDRICH

BY Hauke, Kraus, Gifford, & Patalidis

ATTORNEYS

HOLOGRAPHIC PRESSURE SENSOR

BACKGROUND OF THE INVENTION

The present invention relates to sensor instruments for determining the pressure of a fluid, liquid or gas or the pressure differential between two fluids.

Prior art pressure indicators consist generally of a column of liquid arranged to be vertically displaced relatively to a graduated scale, the column of liquid being contained in a tube dipped in a reservoir partially filled with the liquid. The surface of the liquid is subjected to the fluid whose pressure is to be determined, and the height of the liquid displaced in the tube as a result of the pressure exerted on the surface of the liquid is an indication of the pressure of the fluid.

Alternately, prior art pressure indicators consist of a deformable element such as a flexible diaphragm, a flexible bellows or bulb, or the like, subjected directly, or indirectly, to a deformation or distortion caused by a fluid under pressure, the deformation or distortion of the diaphragm, bellows or bulb, or the like, being transmitted to the pointer of an appropriate meter by mechanical linkage and lever means. Other prior art pressure indicators may consist, for example, of a piezoelectrical crystal to which a stress is applied as a function of the pressure of the fluid to be measured such as to create an EMF which is adequately amplified and applied to the input of a voltmeter or millivoltmeter having appropriate graduations in units of pressure.

The prior art pressure indicators, specially those of the type utilizing mechanical moving parts, are subject to hysteresis, friction and wear which all add up to providing false and erroneous readings, and they all suffer a definite lack of precision in view of the limited scale range generally associated with such instruments. Pressure indicators using a column of liquid, even when the liquid is a heavy liquid such as mercury, are delicate in use, cumbersome, and have a limited range in view of the length of the column of liquid required for wide range applications.

The present invention, by utilizing no moving part and only one deformable element whose amount of deformation or deflection is proportional to the pressure applied on one face thereof, and by comparing the physical image of the deformed element with the reconstructed image of the element at rest, such image being reconstructed from a hologram of the element at rest, permits to achieve a wide degree of precision, sensitivity and wide range, in pressure measurements, in a repetitive manner.

SUMMARY OF THE INVENTION

The present invention contemplates a pressure sensor and indicator in the form of, for example, a deformable diaphragm having a face subjected to a fluid whose pressure is to be determined. The reconstructed image from a hologram of the diaphragm at rest is impinged on the surface of the deformed diaphragm, thus causing a plurality of optical interference fringes whose number and disposition are a representation of the amount of deformation of the diaphragm and, consequently, of the pressure of the fluid. The fringes may be visually observed or, alternately, they may be "read" by an appropriate detector adapted to provide on an appropriate meter an indication of the pressure of the fluid.

BRIEF DESCRIPTION OF THE DRAWINGS

The many objects and advantages of the present invention will become apparent to those skilled in the art when the following description of an example of structural embodiment of the invention is read in conjunction with the accompanying drawings wherein.

DETAILED DESCRIPTION OF THE PREFERRED EMBODIMENT

Figure 1:
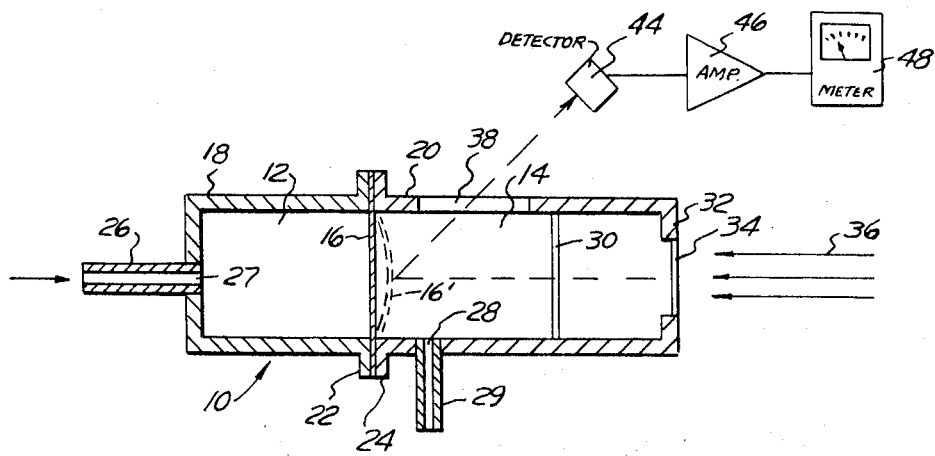
FIG. 1 is a schematic representation of an example of pressure sensor and indicator according to the present invention.

Referring now to the drawings, and more particularly to FIG. 1 thereof, an example of structural embodiment of the present invention comprises a housing, generally designated at 10, having any appropriate shape as, for example, a cylindrical shape. The housing 10 is generally formed of two separate portions so as to define two contiguous chambers 12 and 14 separated by a flexible or deformable wall or diaphragm, as shown at 16. In the example of embodiment shown, the chamber 12 is defined by an enclosure 18 having an open end generally attached to the open end of a second enclosure 20, adequate flanges being provided, as shown at 22 and 24, for fastening of the two housing portions together by means of conventional fastening means, such as screws and the like, the periphery of the deformable diaphragm 16 being sandwiched between the respective flanges, and adequate sealing means, not shown, being provided to insure leak proof joints.

The chamber 12, contained within the housing portion 18, is placed in communication with a fluid, liquid or gas, under pressure, by means of a line 26, having an inlet 27 in the chamber 12. The chamber 14 in the housing portion 20 is provided with an adequate port 28 which may be simply open to the ambient as shown, when it is sought to determine the pressure of a fluid in the chamber 12 relatively to the ambient pressure. It is obvious that in applications where the pressure differential between two fluids is sought to be determined, the chamber 14 is placed in fluid communication with one of the fluids, via port 28 and a line 29, while the chamber 12 is in fluid communication with the other fluid via a line 26.

The chamber 14 is provided on its end opposite the end on which the diaphragm 16 is mounted with a transparent window 30 and with an appropriate frame, as shown at 32, for supporting a hologram 34. The hologram 34 has been previously recorded according to techniques now well known, the object recorded in the hologram 34 being the shape of the diaphragm when at rest, i.e. in the position shown in full line in FIG. 1.

Figure 2:
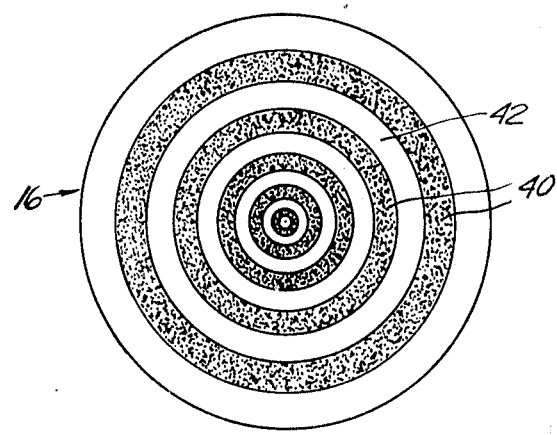
FIG. 2 is a schematic representation of an example of interference fringes as appearing on the deformable element forming part of the present invention.

When fluid is introduced in the chamber 12, the diaphragm 16, made of an appropriate elastically deformable material such as a thin sheet of metal, rubber, plastic or the like, is elastically distorted so as to bulge as shown in dotted line at 16', in view of the pressure in the chamber 14 being less than the pressure in the chamber 12 open to the ambient. The image of the diaphragm 16 when at rest is reconstructed by illuminating the hologram 34 by way of a monochromatic beam of light as arbitrarily shown at 36, the reconstructed image of the diaphragm when of rest being projected upon the bulged out surface of the deformed physical diaphragm. At the same time, the physical diaphragm is illuminated with a monochromatic light beam, which may be part of the light beam 36, in the same manner that was used to record the hologram. If the physical diaphragm 16 is of the same form as the image being reconstructed on the surface thereof, an observer looking directly at the diaphragm through a transparent window 38 observes nothing unusual, but the smallest deformation of the surface of the physical diaphragm produces changes in the wave fronts being reflected from such surface. The wave fronts of the wave reflected by the physical diaphragm interfere with the wave fronts of the reconstructed image, and optical interference fringes are formed in the field of view, the number of such interference fringes and the disposition thereof being representative of the amount of the deformation of the physical diaphragm. The appearance of the optical interference fringes is schematically represented in FIG. 2, shown in an ideal condition of even deflection or deformation of the physical diaphragm as a result of a pressure being exerted on a face thereof.

A plurality of concentric dark regions 40 and bright regions 42 are thus observed on the surface of the deformed diaphragm, it being obvious that such optical fringes in some circumstances of nonuniform deformation of the diaphragm itself, or other faults, would be in the shape of substantially concentric ellipses or of families of parabolae or hyperbolae. Nevertheless, whatever the shape of the actual optical fringes obtained when the physical and reconstructed images of the diaphragm are caused to interfere, the number of fringes, their position in a predetermined area of the diaphragm and the progressive fringe widening, from the center to the periphery of the diaphragm, are repetitively representative of the amount of deformation or distortion of the diaphragm, consequently representative of the pressure differential existing between chambers 12 and 14 of FIG. 1. The distance between the fringes, as well as the number of fringes per unit length in a predetermined radial length of the diaphragm, have a well defined correspondence to the amount of diaphragm deflection.

Referring again to FIG. 1, an example of pressure indicator according to the present invention further contemplates to observe a predetermined area of the deformed diaphragm 16' by means of a detector, such as a photocell or the like as shown at 44, having a well defined field of vision over a predetermined area of the diaphragm surface. The output from the detector is proportional to the light intensity impinging on the detector and consequently is proportional to the number of fringes on a particular area of the diaphragm or to the width of a particular fringe. The output from the detector 44 is applied, after amplification by way of amplifier 46, to a meter 48. By proper calibrations of the amplifier 46 and meter 48, the meter 48 is caused to provide a visual quantitative display of the pressure of the fluid in the chamber 12 of the instrument, by way of a pointer displaceable relatively to an appropriate scale expressed in units of pressure, such as p.s.i. and the like. It is further obvious that the sensitivity of the instrument may be appropriately calibrated, and that several ranges of sensitivity may be provided so as to permit readings in high pressure ranges as well as low pressure ranges.

Having thus described the present invention by way of an example of embodiment thereof, what I claim to be protected by United States Letters Patent is as follows:

1. In a fluid pressure sensor, a deformable diaphragm, means for subjecting a face of the diaphragm to a fluid under pressure so as to elastically deflect said diaphragm proportionally to the pressure of said fluid, a hologram of said diaphragm in its undistorted state, means for reconstructing an image of said diaphragm from said hologram and for projecting said image upon said deflected diaphragm so as to cause optical interference fringes to appear on said diaphragm wherein the umber and arrangement of said fringes provide an indication of the pressure of said fluid.

2. The fluid pressure sensor of claim 1 further comprising detector means supplying an output signal as a function of the number of said fringes in a predetermined area of said diaphragm.

3. The fluid pressure sensor of claim 1 further comprising detector means supplying an output signal as a function of the average light reflected by a predetermined area of said diaphragm.

4. The fluid pressure sensor of claim 2 wherein said output signal is converted in units of pressure.

5. The fluid pressure sensor of claim 3 wherein said output signal is converted in units of pressure.

6. A method for measuring the pressure of a fluid comprising subjecting a face of a diaphragm to fluid under pressure so as to elastically deflect said diaphragm proportionally to the pressure of said fluid, and projecting on said diaphragm a reconstructed image from a hologram of said diaphragm in its undistorted state so as to cause interference fringes to appear on said diaphragm, wherein the number and arrangement of said fringes provides an indication of the pressure of said fluid.

7. The method of claim 6 further comprising counting the number of said fringes in a predetermined area of said diaphragm.

8. The method of claim 6 further comprising detecting the average light reflected by a predetermined area of said diaphragm.

9. The method of claim 7 wherein said counting is converted in units of pressure.

10. The method of claim 8 wherein said average light is converted in units of pressure.